United States Patent
Sample

(10) Patent No.: US 7,620,640 B2
(45) Date of Patent: Nov. 17, 2009

(54) CASCADING INDEX METHOD AND APPARATUS

(75) Inventor: Neal Sample, Santa Cruz, CA (US)

(73) Assignee: Rightorder, Incorporated, San Jose, CA (US)

( * ) Notice: Subject to any disclaimer, the term of this patent is extended or adjusted under 35 U.S.C. 154(b) by 436 days.

(21) Appl. No.: 10/912,872

(22) Filed: Aug. 6, 2004

(65) Prior Publication Data

US 2005/0038798 A1    Feb. 17, 2005

Related U.S. Application Data

(60) Provisional application No. 60/495,107, filed on Aug. 15, 2003.

(51) Int. Cl.
*G06F 17/30* (2006.01)
(52) U.S. Cl. ................................... 707/100; 707/104.1
(58) Field of Classification Search .................. 707/100, 707/104.1
See application file for complete search history.

(56) References Cited

U.S. PATENT DOCUMENTS

| 6,041,053 | A | * | 3/2000 | Douceur et al. | 370/389 |
| 6,694,323 | B2 | * | 2/2004 | Bumbulis | 707/101 |
| 2003/0204513 | A1 | * | 10/2003 | Bumbulis | 707/100 |
| 2003/0204515 | A1 | * | 10/2003 | Shadmon et al. | 707/100 |
| 2004/0015494 | A1 | * | 1/2004 | Basso et al. | 707/3 |

* cited by examiner

*Primary Examiner*—Isaac M Woo
*Assistant Examiner*—Johnese Johnson
(74) *Attorney, Agent, or Firm*—Michael A. Glenn; Glenn Patent Group

(57) ABSTRACT

An architecture, apparatus, and method for a cascading index of a plurality of PATRICIA trie blocks are shown. The invention discloses a method of a two-dimensional indexing system using PATRICIA trie properties in both dimensions to overcome prior art imbalances in data access as well as simplifying the access solutions.

14 Claims, 9 Drawing Sheets

CASCADING INDEX METHOD AND APPARATUS

CROSS-REFERENCE TO RELATED APPLICATIONS

This application claims priority to U.S. provisional patent application Ser. No. 60/495,107 submitted Aug. 15, 2003 which application is incorporated herein in its entirety by this reference thereto.

BACKGROUND OF THE INVENTION

1. Technical Field

The invention relates generally to PATRICIA tries. More specifically, the invention relates to a cascading index of PATRICIA tries.

2. Discussion of the Prior Art

The Practical Algorithm To Retrieve Information Coded In Alphanumeric (PATRICIA) is a trie shown by D. R. Morrison in 1968. It is well known in the industry as a compact way for indexing, and it is commonly used in databases, as well as in networking technologies. In a PATRICIA implementation, nodes that have only one child are eliminated. The remaining node is labeled with a character position number that indicates the node's depth in the uncompressed trie. FIG. 1 shows an example of such an implementation of a PATRICIA trie for an alphabetical case. The words to be stored are 'greenbeans,' 'greentea,' 'grass,' 'corn,' and 'cow.' The first three words differ from the last two words words in the first letter, i.e. three other words begin with the letter 'g,' while the other two begin with the letter 'c.' Hence, there is a difference at the first position. Therefore, there is a node 110-1 at depth '0' separating the 'g' words from the 'c' words. The edge connecting nodes 110-1 and 110-2 hold the characters 'gr' and the edge connecting nodes 110-1 and 110-3 hold the characters 'co.' Moving on the 'gr' side, the next time a difference is found is in the third position where two words have an 'e' while one word has an 'a.' Therefore, a node 110-2 at that level indicates a depth level of '2', i.e. the depth level equivalent to the length of the string 'gr.' Continuing down the left path reveals that the next time a different letter is found is at the 6th position of the 'greenbeans' and 'greente' words, where one word has a 'b' while the other has a 't.' Therefore, there is a node 110-4 at depth '5.' The words, i.e. keys are stored in the leaves 120. For example, leaf 120-1 contains the key 'greenbeans,' the leaf 120-2 contains the key 'greentea,' and so on.

The problem with this implementation is that keys are not uniquely specified by the search path. Hence, the key itself has to be stored in the appropriate leaf. The advantage of this is that only t*n pointers are required, where 't' is the size of the alphabet and 'n' is the number of leaves. For purposes of the discussion herein, a alphabet is group of symbols, where the size of an alphabet is determined by the number of symbols in the group. That is, an alphabet having a t=2 is binary alphabet having only two symbols, e.g. '0' and '1.' FIG. 2 shows an exemplary implementation for such an alphabet with two nodes 210-1 and 210-2 and three leaves 220-1, 220-2 and 220-3, including the keys '1000,' 1110,' and '1111,' respectively. For binary PATRICIA tries, the number of internal nodes 210 is equal to the number of leaves 220 minus 1. The height of the PATRICIA trie is bounded by the number of leaves 'n.'

A PATRICIA trie is either a leaf L(k) containing a key k or a node N(d, l, r) containing a bit offset d≧0 along with a left sub-tree l, and a right sub-tree r. This is a recursive description of the nodes of a PATRICIA tree, and leaves descending from a node N(d, l, r) must agree on the first d−1 bits. A description of PATRICIA tries may be found in A Compact B-Tree, Bumbulis and Bowman, Proceedings of the 2002 ACM SIGMOD international conference on Management of data, pages 533-541, which is herein incorporated in its entirety by this reference thereto. A block of pointers may be now prepared using the PATRICIA trie architecture, the block having pointers that allow, for efficient retrieval of the data. The number of pointers or fanout of the block may be calculated, based on several parameters.

A PATRICIA trie is split when a trie no longer fits on a disk block. The PATRICIA trie is split such that the split operation returns two PATRICIA tries, each conforming to the PATRICA trie characteristics. Reference is made to FIG. 3A, where a parent and child node, N(d, l, s) and s respectively, are shown. A split operation takes place (FIG. 3B) returning two PATRICIA tries, $T_2$ 320 containing s, and $T_1$ 310 containing the original parent node and a descendant pointer to s such that $T_1$ and $T_2$ contain all of the leaves of the original trie. The trie $T_2$ 320 consists of the new root node s and all labeled nodes and leaves which are on the path from the original root to d that additionally have a 1 at position d+1. The trie $T_1$ 310 consists of all other nodes in the original trie. The split operation can take any required depth to accommodate overflow of data in a given disk block. Similarly merge operations are also possible.

The arbitrary split process is a contributing factor to the difficulty of using PATRICIA tries within block-based systems, where the blocks reside in a differentiated memory hierarchy. This is true even with a simple hierarchy, such as main-memory to disk. With a PATRICIA trie, some pointers to data are near the root, while others are quite far. This inherent imbalance comes both from the key values inserted, and from the insertion order of the keys. For some ideal PATRICIA tries, this means that query performance can be O(log N), where N is the number of blocks in the PATRICIA trie. However, for other PATRICIA tries, worst case query performance is O(N). It is therefore that PATRICIA tries present several difficulties, such as that they are not good for low-latency operations, they are difficult to plan with, they are probabilistic data structures, and they are difficult to allocate resources to.

Previously, prior art solutions attempted to use an additional indexing dimension. However, the techniques used resulted in complex solutions, such as those proposed, for example, in U.S. Pat. No. 6,208,993 by Shadmon, which uses layered index approach to balance the trie. Specifically, there is the possibility of multiple erroneous path selections due to the compacting of the PATRICIA trie block. Additionally, in Shadmon the upper layers are not managed by an actual PATRICIA, but through a more complex, proprietary structure.

It would be therefore advantageous to provide a solution taking advantage of the strength of the PATRICIA trie, while overcoming at least the weaknesses discussed above, including, but not limited to, the inherent imbalance of PATRICIA trie blocks. It would be further advantageous if all data structures would be PATRICIA tries and furthermore if the number of errors were bound.

SUMMARY OF THE INVENTION

An architecture, apparatus, and method for a cascading index of a plurality of PATRICIA trie blocks are shown. The invention discloses a method of a two-dimensional indexing system using PATRICIA trie properties in both dimensions to overcome prior art imbalances in data access as well as simplifying the access solutions.

DETAILED DESCRIPTION OF THE INVENTION

To overcome the limitations of prior art, the invention herein disclosed adds a leaf to a PATRICIA trie implementation that may optionally belong to a node, adds U.S. patent application filed Jul. 26, 2004, entitled *Method and Apparatus for Ternary PATRICIA Trie Blocks*, assigned to common assignee, hereinafter, the Ternary PATRICIA Trie patent application, and which patent application is hereby incorporated herein in its entirety by this reference thereto.

Figure 1:
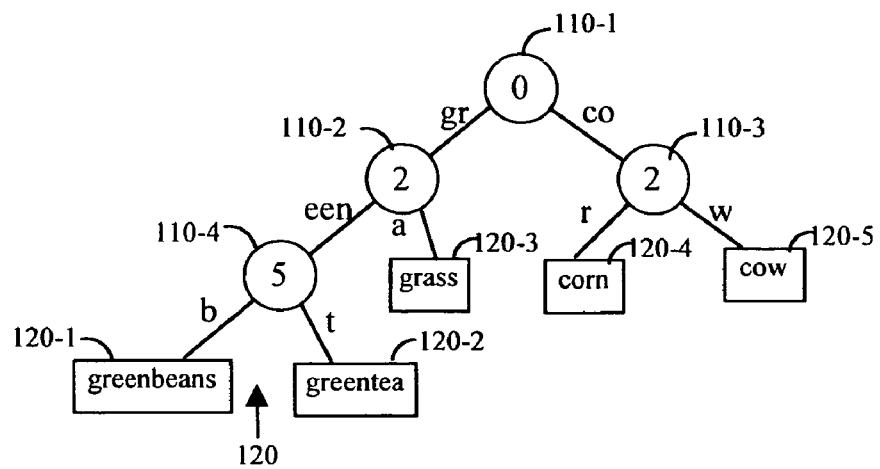
FIG. 1 is an example of a PATRICIA trie for an alphabetical case (prior art)
Figure 2:
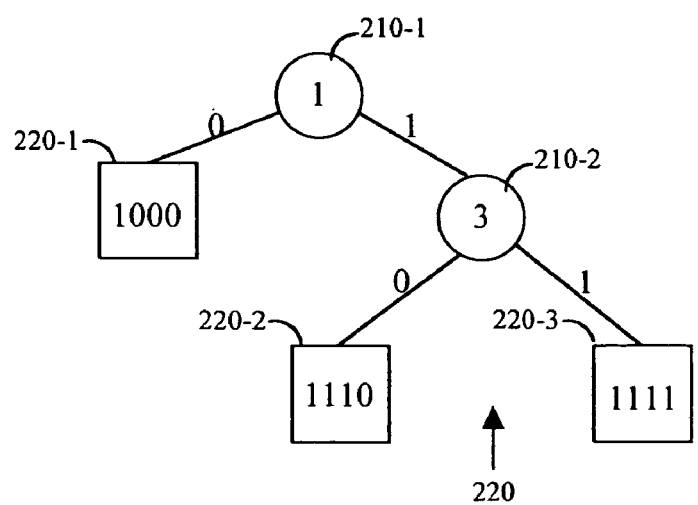
FIG. 2 is an example of PATRICIA trie for a numerical case (prior art)
Figure 3A:
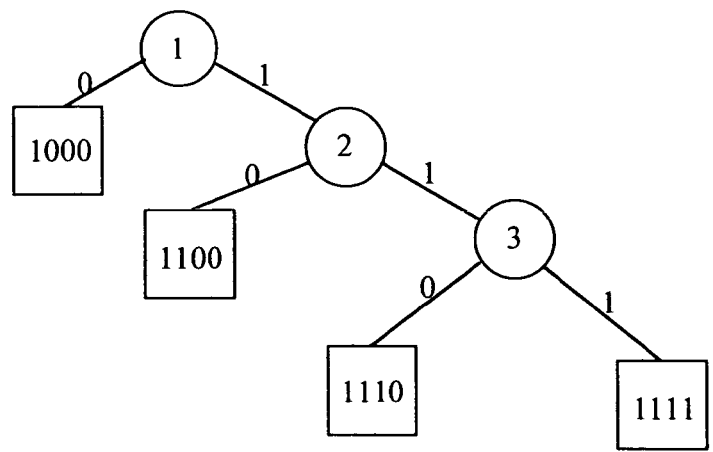
FIG. 3 is an example showing splitting of a PATRICIA trie (prior art)
Figure 3B:
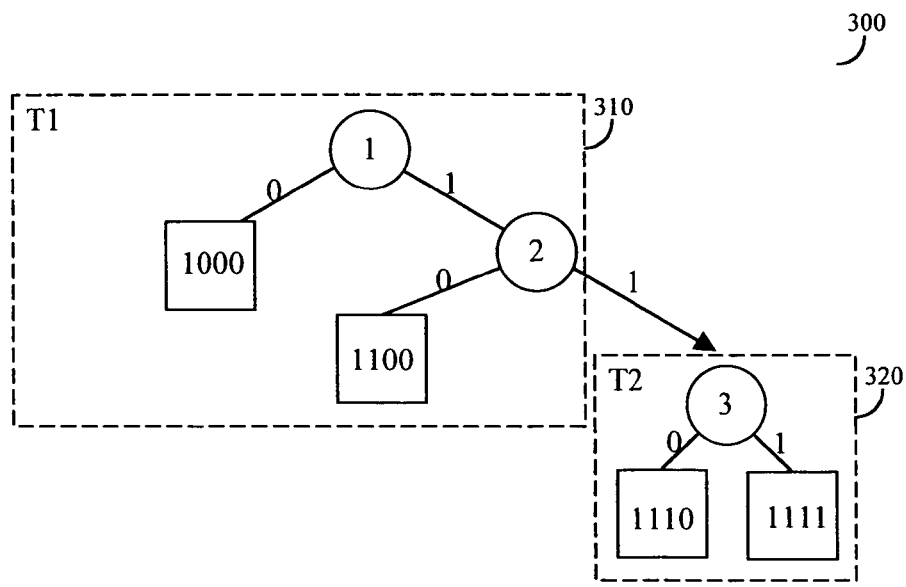
Figure 4:
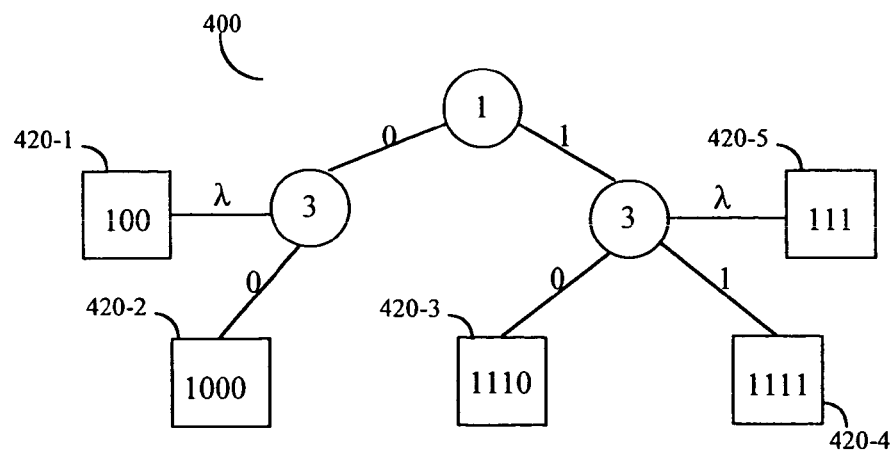
FIG. 4 is an exemplary PATRICIA trie with keys that are a prefix of another according to the invention.

Reference is now made to FIG. 4, where a non-limiting exemplary PATRICIA trie 400 with keys that are a prefix of another trie is shown. On the left branch, a key 420-1 with a value of '100' is a prefix of key 420-2 with a value of '1000,' resulting in a PATRICIA trie node having two labels. On the right branch, a key 420-5 with a value of '111' is a prefix to keys 420-3 and 420-4 with values of '1110' and '1111' respectively, resulting in a PATRICIA trie node having three labels. These elements are added as a means of handling variable-length binary keys that do not have a unique end-of-key token. A node in a modified PATRICIA trie disclosed in the Ternary PATRICIA Trie patent application can be described as N(d,l,r,n) containing a bit offset $d \geq 0$ along with a left sub-tree l, a right sub-tree r, and the optional leaf or node n. Using the Ferguson strategy, the PATRICIA trie 400 encodes as "1:3:null:leaf:3:null:leaf:leaf," yielding a linear time search.

Figure 5A:
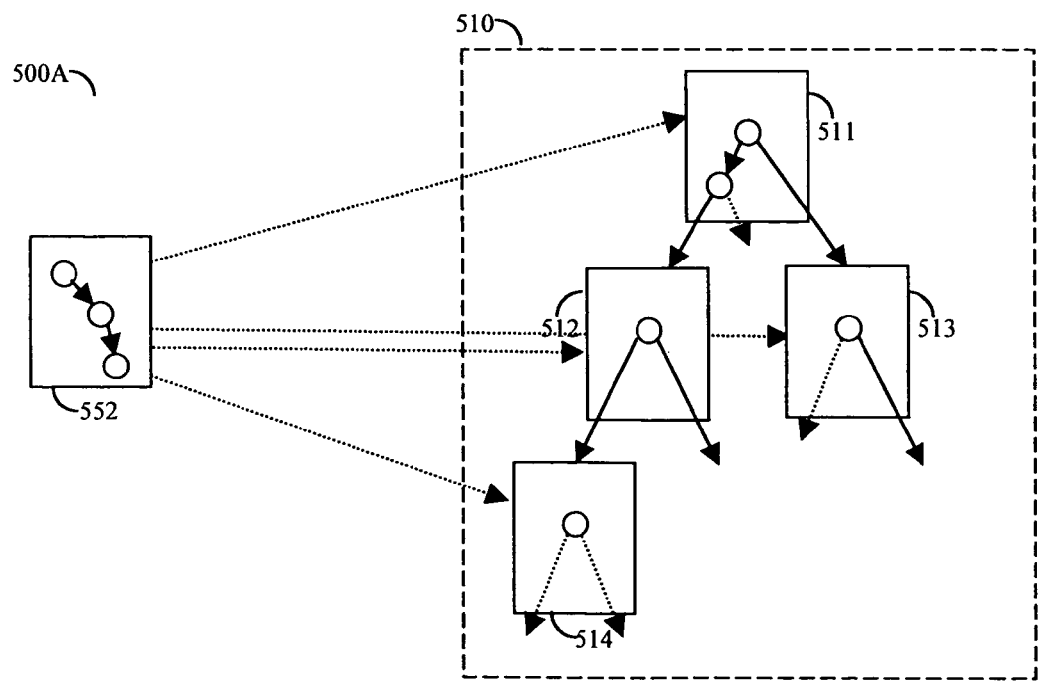
FIGS. 5A and 5B show an exemplary cascading index structure using a plurality of PATRICIA tries according to the invention.
Figure 5B:
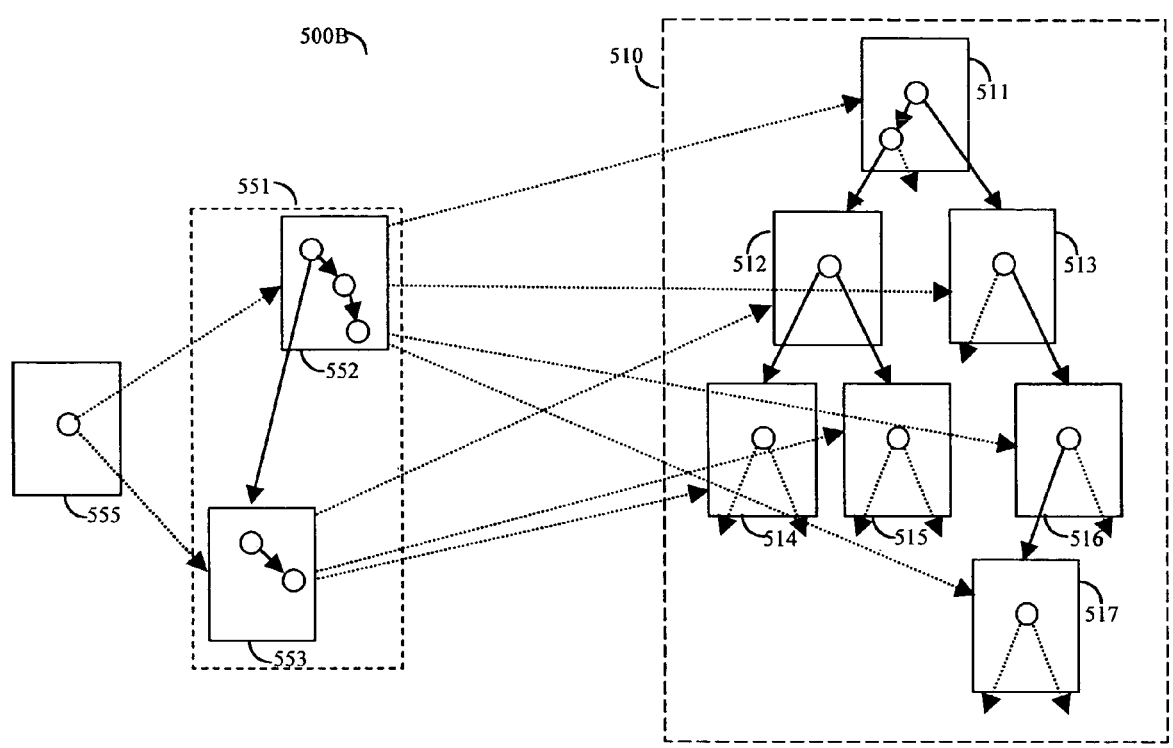

Reference is now made to FIGS. 5A and 5B, where a non-limiting exemplary cascading index structure 500A/500B using a plurality of PATRICIA tries is shown. Referring to FIG. 5A, a PATRCIA trie structure 510 having a plurality of PATRICIA trie blocks 511 through 514, collectively representing a PATRICIA index, is shown. Such a structure 510 is created as a result of splits of PATRICIA trie blocks when one PATRICIA block is not sufficient to handle all the indexes. Structure 510 is therefore an example of a typical PATRICIA trie structure. Using the null-label method introduced in the Ternary PATRICIA Trie patent application, a cascading PATRICIA index 500A may be created. In such a cascading PATRICIA index, a PATRICIA trie block 552 is used to index the PATRICIA trie structure 510, resulting in a cascading index system 500A. For each Patricia block 511-514, a label is added to block 552 that allow reference for the purpose of a cascading index structure. For example, PATRICIA trie block 511 may have a null-label used to index it from the indexing PATRICIA trie block 552. It should be noted that an index PATRICIA trie block is added only when PATRICIA trie structure 510 consists of two or more PATRICIA trie blocks. To create a first level cascading index a new index PATRICIA block, to index the blocks in PATRICIA trie structure 510, is created. In this new index PATRICIA block, one key is inserted for each of the PATRICIA trie blocks in PATRICIA trie structure 510. Each key $k_i$ is the prefix of the block i in PATRICIA trie structure 510, where a key $k_i$ points to the block i in PATRICIA trie structure 510.

Referring to FIG. 5B, an expanded case 500B of the one level cascading index is shown. While in the case described above a single index PATRICIA trie block 552 was sufficient to handle the indexing of PATRICIA trie structure 510, the adding of additional PATRICIA trie blocks 515 through 517 may cause the index PATRICIA trie 552 to overflow. This results in a split, which creates another index PATRICIA trie, for example index PATRICIA trie 553. Hence, a new index PATRICIA trie structure 551 is created having two index PATRICIA trie blocks 552 and 553. If there are two or more such index PATRICIA trie blocks in structure 551, then the indexing step is performed again, creating for example index PATRICIA trie 555. In the resulting cascading index 500B, built with successively smaller PATRICIA tries, each of the smaller PATRICIA tries works as index into the next larger PATRICIA trie, i.e. index PATRICIA trie 552 is larger than index PATRICIA trie 555. Each of the smaller indexes is called a sparse index because they contain less information than their larger peers. Each of the cascading index layers, i.e. an index PATRICIA trie structure such as 551, comprised of only tries that conform to the PATRICIA rules, and avoiding proprietary or unique structures. Therefore, handling of such blocks is balanced, simpler, and consistent throughout the cascading index structure.

Figure 6:
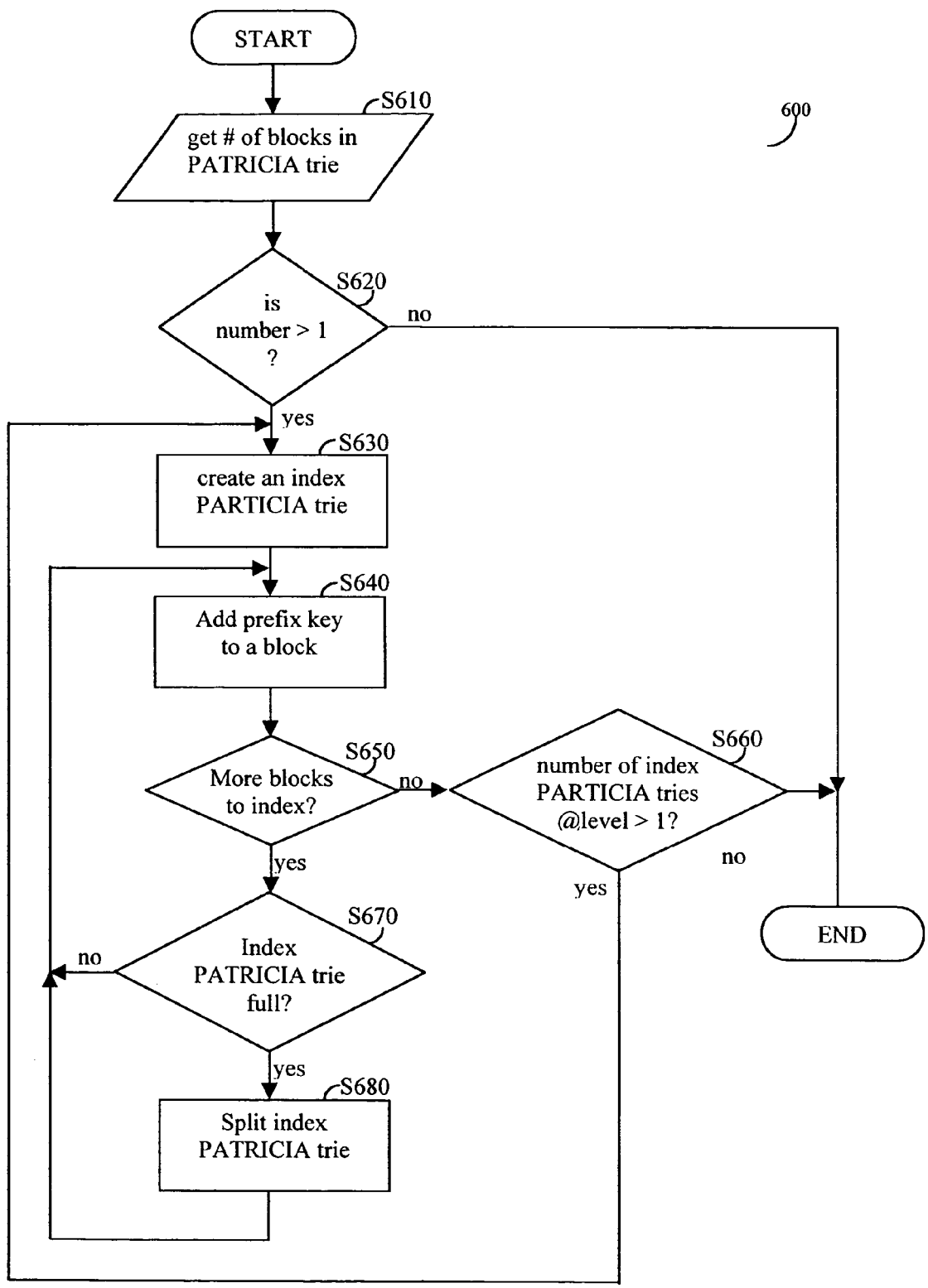
FIG. 6 is a flowchart showing the creating of a cascading index according to the invention.

Referring to FIG. 6, a non-limiting exemplary flowchart 600 for a method for creating a cascading index is shown. In step S610, the number of blocks in a PATRICIA trie structure is examined, and such number is checked and compared in step S620 to determine if there are two or more such PATRICIA trie blocks. Execution continues with step S630 if there are two or more PATRICIA trie blocks in the structure and terminates otherwise. In step S630 an index PATRICIA trie block is created, and in step S640 a prefix key to a PATRICIA trie block is added. In step S650 it is checked whether additional blocks exist and if so execution continues with step S670. Otherwise, execution continues with step S660. In step S660, it is checked whether there are additional index PATRICIA blocks at the given level and, if so, execution continues with step S630. Namely, a new index PATRICIA trie block is created which has prefix keys to the index PATRICIA trie blocks of the previous level. Otherwise, execution terminates because the cascading index is complete. Returning to step S670, the index PATRICIA trie block is checked to determine if it may be able to handle an additional prefix key and, if so, execution continues with step S640. Otherwise, execution continues with step S680 where the index PATRICIA trie block is split, as explained above. Thereafter, execution continues with step S640, where the new prefix keys are added to the newly split index PATRICIA block.

Figure 7:
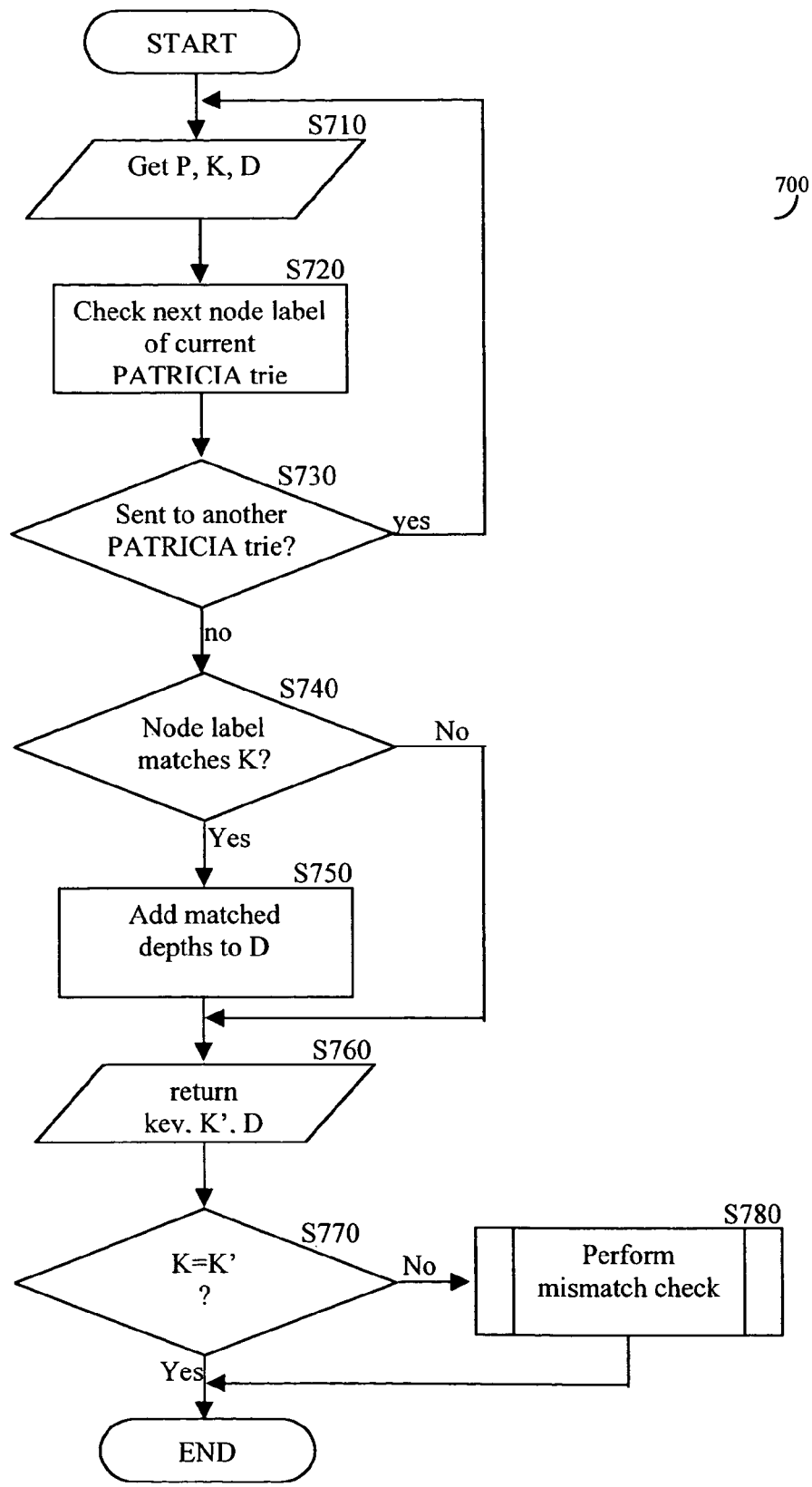
FIG. 7 is a flowchart showing a search algorithm for a cascading index according to the invention.

One advantage of the invention is that no more than a single mismatch per level can occur during a search operation on the cascading index system. Reference is made now to FIG. 7 where a non-limiting, exemplary flowchart 700 for a search algorithm for a cascading index is shown. Specifically, described is a high-level search algorithm for a key K, starting with the single block index PATRICIA trie P in a cascading index, implemented in accordance with the disclosed invention. The depths and values of matching bits in D, which is initially empty, are tracked. In step S710, the search begins by providing the information of the index PATRICIA trie P, the key K, and D initially set to be empty. In step S720, the next node label of the index PATRICIA trie P is checked. In steps S730, based on the label information, if another index PATRICIA trie is to be accessed execution continues with step S710. The process continues to the entire depth of the index structure. Otherwise, execution continues with step S740. In step S740 it is checked whether the node label K' matches K, and, if so, in step S750 the matched depths are added to D, execution continuing with step S760. Otherwise, execution continues with step S760. In step S760, the values of the key, a K', and D are returned. In step S770, it is checked whether the returned K' matches K and, if so, the data were found and the process terminates. Otherwise, execution continues with step S780. In step S780, the case of K' is greater or less than K is handled. It may be that K does exist in the cascading index, but that it was missed during search due to the compressed nature of the index PATRICIA trie. Therefore, a separate algorithm, explained in more detail below with reference to FIG. 8, takes place to detect whether such other path exists in the index PATRICIA trie. After the execution of this step there is a positive indication if the key K exists or not which, as noted, is a significant advantage over prior art because only one or two passes are required, versus an unknown number of passes, in cases of a mismatch, in prior art solutions. A person skilled-in-the-art would easily be able to use insert, delete, split, and merge operations on the index PATRICIA trie structure.

Figure 8:
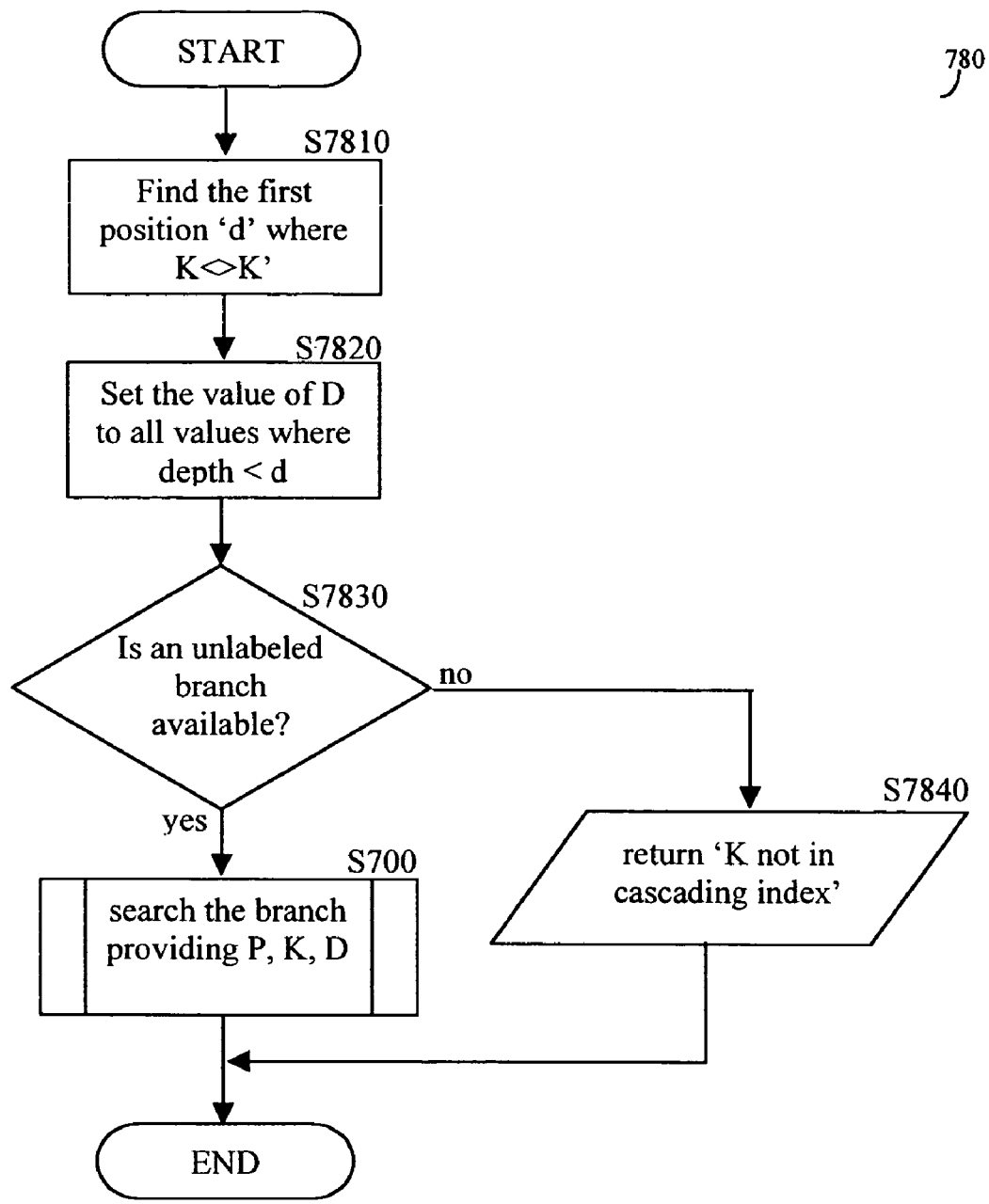
FIG. 8 is a flowchart showing an algorithm for handling a mismatch in an index PATRICIA trie according to the invention.

Referring to FIG. 8 a non-limiting exemplary flowchart S780 of an algorithm for handling a mismatch in an index PATRICIA trie is shown. In step S7810, the first bit position, d, where K and K' differ, is found. In step S7820, all values in D where the depth is less than d are accepted. Then, at step S7830 the first value in D that is less than or equal to d, it is checked whether there is available an unlabeled branch. If an unlabeled branch is not available, K is not in the index and such information is returned in step S7840. Otherwise, execution continues with step S700, where the selected unlabeled branch is searched using the algorithm disclosed above. The process can be repeated up to one time per index PATRICIA trie in the cascading index.

In addition to the search for a specific value there is a need to search for a range of values, where the range is defined by low and high values. One approach to performing range queries is to query for the low value in the range and then query for the high value, and then return the intervening entries. This approach may be expensive, especially if only a few values are returned and the cost of the second probe is significant. This approach may also be difficult when traversing the cascading index between the end values, because it is not generally possible to order two PATRICIA pages, i.e. the values of the keys on one PATRICIA trie block could be intermingled with the values on another PATRICIA trie block.

Figure 9:
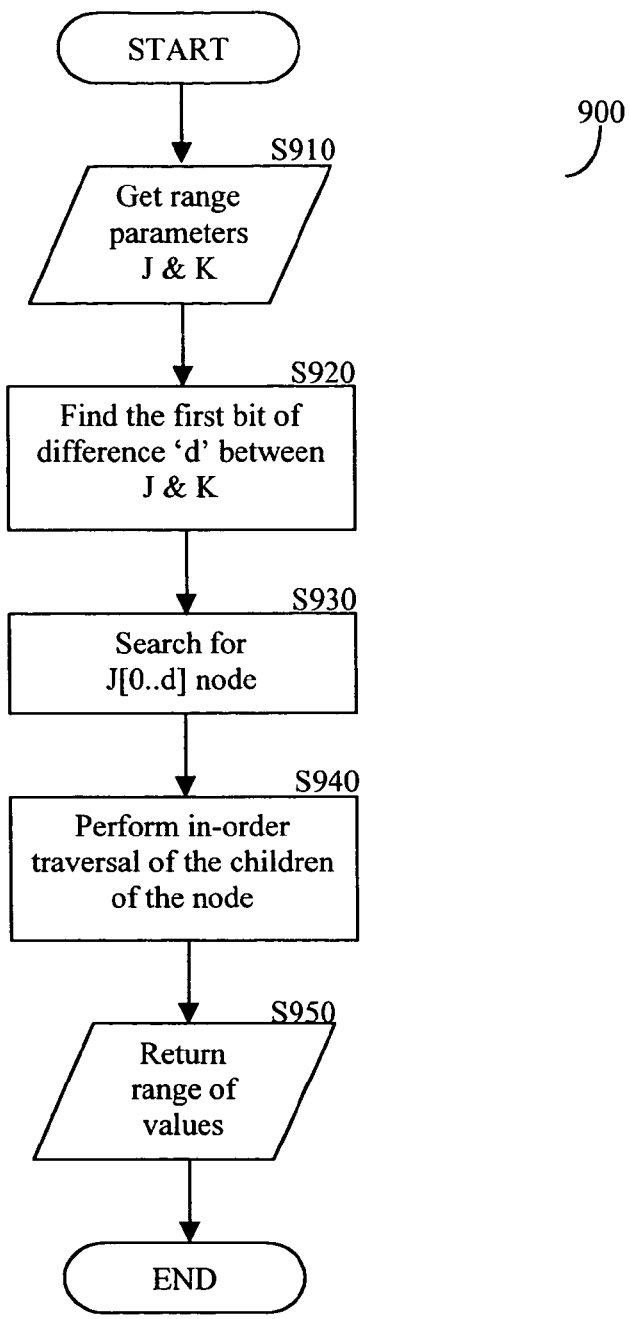
FIG. 9 is a flowchart showing a range search of an index PATRICIA trie structure according to the invention.

Reference is now made to FIG. 9, which is a non-limiting flowchart 900 describing a method for range search of an index PATRICIA structure in accordance with an exemplary embodiment of the invention. It should be noted that the two endpoint values for a range can be represented by two keys, J and K. In step S910, the two endpoints J and K are input. In step S920, by comparing J to K, the first bit of difference, d, between K and J, is found. Based on this information, in step S930 a query for j[0 . . . d] (or K[0 . . . d] because they are identical) results with the uppermost node of depth ≦d that corresponds to the limits of the range J to K. In step S940, an in-order traversal of the children of that uppermost node yields all values, in order, that comprise the range [J . . . K]. A person skilled-in-the-art would notice that there may be some values at the limits, values less than J or greater than K, to be removed from the set. The range search results are the output in step S950.

Figure 10:
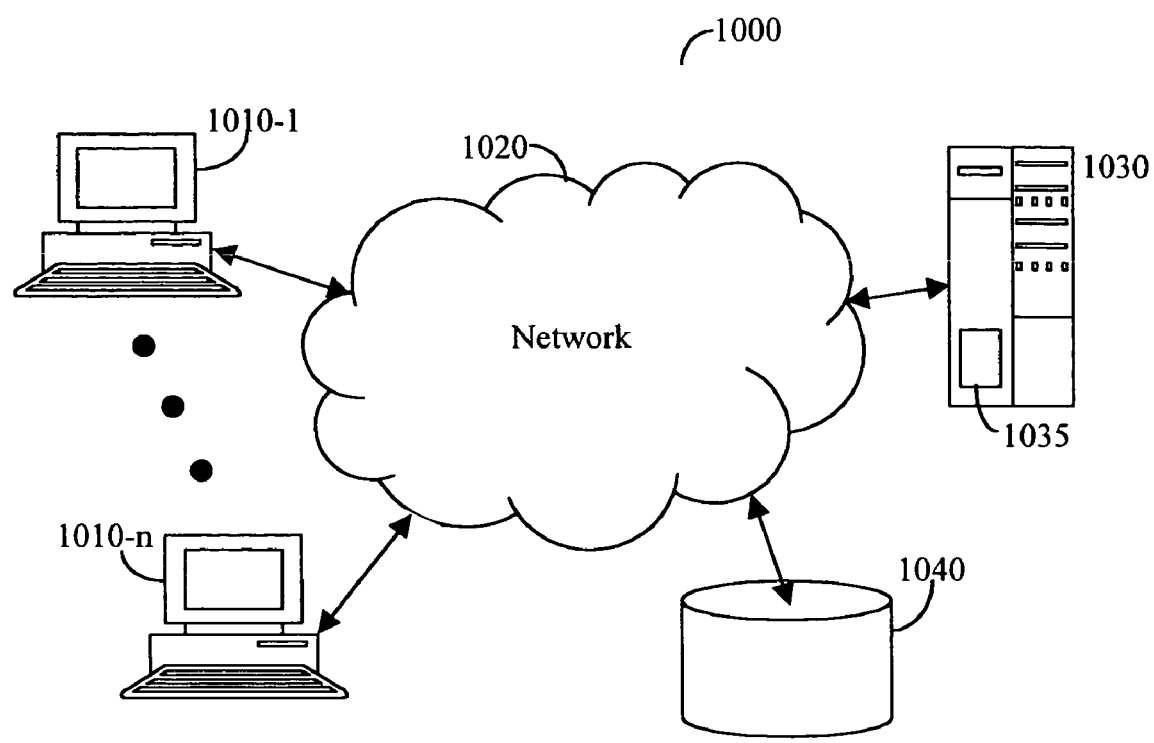
FIG. 10 is a block schematic diagram showing a computer network having access to a database system using a cascading index PATRICIA structure according to the invention.

Reference is now made to FIG. 10 where an exemplary and non-limiting computer network having access to a database system is shown. The network comprises a plurality of access endpoints 1010, including, but not limited to, personal computers (PCs), workstations (WSs), personal digital assistants (PDAs), and other means of network accessing devices, capable of or having a need to access a database. The devices are connected to a network 1020, which is shown as a simple network for the purpose of simplicity. However, network 1020 may be a local area network (LAN), wide area network (WAN), wireless network, and other types of networks, as well as all combinations thereof. Connected to the network is a server 1030 containing at least a database management system (DBMS) 1035, comprising at least a cascading index structure, as disclosed in greater detail above. A storage system 1040 is connected to the system to handle the large amount of data normally handled by a database. The storage system may be a local means of storage, including being part of server 1030, it may be a geographically distributed storage system, or it may be a combination thereof. A database system configured with the cascading index structure to access the data in the database will enjoy the benefits of the invention disclosed herein, including significant performance improvement over prior art solutions, as described herein.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

The invention claimed is:

1. A computer-implemented method to search a cascading index structure using a database management system comprising a processor and a memory, said processor configured to execute instructions stored in said memory, the method comprising the steps of:

providing a first index PATRICIA trie comprising a plurality of node labels, each node label referencing a block in a second index PATRICIA trie;

providing said second index PATRICIA trie comprising at least one index PATRICIA trie block, each index PATRICIA trie block comprising at least one key, each key corresponding to a prefix of a block in a PATRICIA trie structure, each key having a depth level;

providing said PATRICIA trie structure, said PATRICIA trie structure comprising a plurality of PATRICIA trie blocks, each PATRICIA trie block comprising at least one node that stores bits;

said processor receiving said first index PATRICIA trie to search said PATRICIA trie structure;

said processor checking if said first index PATRICIA trie comprises a first node label that references said second index PATRICIA trie in said cascading index structure;

if said first index PATRICIA trie references a second index PATRICIA trie, said processor checking an entire depth of said first index PATRICIA trie;

said processor checking whether a next node label matches said PATRICIA trie key;

if said next node label key matches said PATRICIA trie key, said processor adding said matched depths to said depth level;

if said next node label key is different than said second index PATRICIA trie key, said processor checking based on a second next node label of said index PATRICIA trie if said second next node label key matches said PATRICIA trie key and, if so, said processor adding a number of matched depths to said depth level; and the processor returning said key and said depth level as results of said search if said second index PATRICIA trie key matches said PATRICIA trie structure key.

2. The method of claim 1, further comprising the steps of:

comparing a returned value of said key and a returned value of said node label; and performing a mismatch check if said comparing step results in inequality; otherwise, terminating said method.

3. The method of claim 1, further comprising the step of: initially setting said depth level to be empty.

4. The method of claim 1, wherein said PATRICIA trie structure comprises a plurality of ternary PATRICIA trie blocks.

5. The method of claim 1, wherein said index PATRICIA trie block comprises a ternary PATRICIA trie block.

6. The method of claim 2, further comprising the step of: performing a range search.

7. The method of claim 6, said range search further comprising the steps of:

finding a first bit position of difference between said returned values; and checking whether there is available an unlabeled branch from a first value in said depth level that is less than said first bit position and, if so, searching said unlabeled branch; otherwise, said key is not in said cascading index.

8. A computer program comprising computer executable code to search a cascading index structure, said computer program being stored on a computer readable storage medium and, when executed, said computer program implementing a method in a computer comprising the steps of:

providing a first index PATRICIA trie comprising a plurality of node labels, each node label referencing a block in a second index PATRICIA trie;

providing said second index PATRICIA trie comprising at least one index PATRICIA trie block, each index PATRICIA trie block comprising at least one key, each key corresponding to a prefix of a block in a PATRICIA trie structure, each key having a depth level;

providing said PATRICIA trie structure, said PATRICIA trie structure comprising a plurality of PATRICIA trie blocks, each PATRICIA trie block comprising at least one node that stores bits;

receiving said first index PATRICIA trie to search of said PATRICIA trie structure;

checking if said first index PATRICIA trie comprises a first node label that references said second index PATRICIA trie in said cascading index structure;

if said first index PATRICIA trie references a second index PATRICIA trie, said processor checking an entire depth of said first index PATRICIA trie;

checking whether a next node label matches said PATRICIA trie key;

if said next node label key matches said PATRICIA trie key, adding said matched depths to said depth level;

if said next node label key is different than said second index PATRICIA trie key, checking based on a second next node label of said index PATRICIA trie if said second next node label key matches said PATRICIA trie key and, if so, adding a number of matched depths to said depth level; and returning said key and said depth level as results of said search if said second index PATRICIA key matches said PATRICIA trie structure key.

9. The computer program of claim 8, further comprising the steps of:

comparing a returned value of said key and a returned value of said node label; and performing a mismatch check if said comparing step results in inequality; otherwise, terminating said code execution.

10. The computer program of claim 8, further comprising the step of:

initially setting said depth level to empty.

11. The computer program of claim 8, wherein said PATRICIA trie structure comprises a plurality of ternary PATRICIA trie blocks.

12. The computer program of claim 9, wherein said index PATRICIA trie block comprises a ternary PATRICIA trie block.

13. The computer program of claim 9, further comprising the step of:

performing a range search.

14. The computer program of claim 13, said range search further comprising the steps of:

finding a first bit position of difference between said returned values; and checking whether there is available an unlabeled branch from a first value in said depth level that is less than said first bit position and, if so, searching said unlabeled branch; otherwise, said key is not in said cascading index and returning such information.

* * * * *